United States Patent
Lloyd

(12) 
(10) Patent No.: US 7,273,545 B1
(45) Date of Patent: Sep. 25, 2007

(54) WATER INTAKE OPEN CAVITY DRUM FOR ORNAMENTAL AND FISH PONDS

(76) Inventor: Bruce S. Lloyd, 11F Poco Way, American Canyon, CA (US) 94503

( * ) Notice: Subject to any disclaimer, the term of this patent is extended or adjusted under 35 U.S.C. 154(b) by 55 days.

(21) Appl. No.: 11/067,566

(22) Filed: Feb. 25, 2005

Related U.S. Application Data

(60) Provisional application No. 60/548,499, filed on Feb. 25, 2004.

(51) Int. Cl.
*B01D 35/02* (2006.01)

(52) U.S. Cl. .................. 210/162; 210/170.09; 405/127

(58) Field of Classification Search ................ 210/153, 210/162, 170, 460; 405/127; 285/148.23
See application file for complete search history.

(56) References Cited

U.S. PATENT DOCUMENTS

| | | | | |
|---|---|---|---|---|
| 705,364 A | * | 7/1902 | Kurtz | 210/170 |
| 1,451,394 A | * | 4/1923 | Hurst | 210/162 |
| 1,945,824 A | * | 2/1934 | Saxe | 210/460 |
| 2,015,274 A | * | 9/1935 | Johnston | 210/460 |
| 2,311,708 A | * | 2/1943 | Sundholm | 285/148.23 |
| 2,957,579 A | * | 10/1960 | McCombie | 210/460 |
| 3,037,636 A | * | 6/1962 | McFarlin | 210/460 |
| 3,109,812 A | * | 11/1963 | McAulay et al. | 210/460 |
| 3,206,036 A | * | 9/1965 | Hawley | 210/460 |
| 3,782,552 A | * | 1/1974 | Wendell | 210/460 |
| 6,949,198 B2 | * | 9/2005 | Reber | 210/170 |
| 2005/0067833 A1 | * | 3/2005 | Ball | 285/148.23 |

* cited by examiner

*Primary Examiner*—Christopher Upton
(74) *Attorney, Agent, or Firm*—Craig Stainbrook; Charmaine Stainbrook; Stainbrook & Stainbrook, LLP

(57) ABSTRACT

A water intake open cavity drum for ponds, which includes a drum body with a lower portion defining a cavity and an upper portion defining a cavity in fluid communication with the lower portion cavity but having less volume than that of the lower portion. The drum includes a plurality of stabilizing feet, at least one water inlet disposed in the lower portion, a water outlet disposed from the upper portion, and a venturi interposed between the water inlet and water outlet. Filtering media is disposed in the cavity, and when a pump is applied to the water outlet, a vortex is formed in the drum body interior which rapidly circulates water throughout the filtering media before it passes out the water outlet.

15 Claims, 4 Drawing Sheets

FIG._1

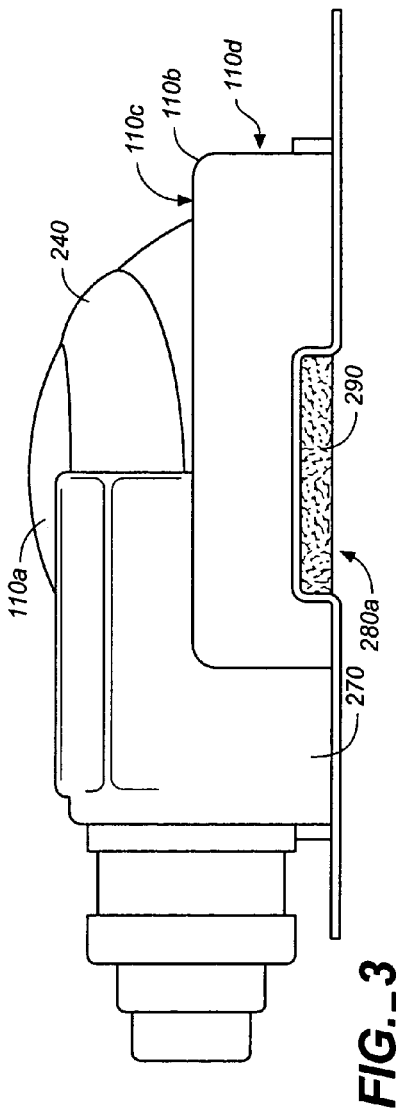
FIG._3
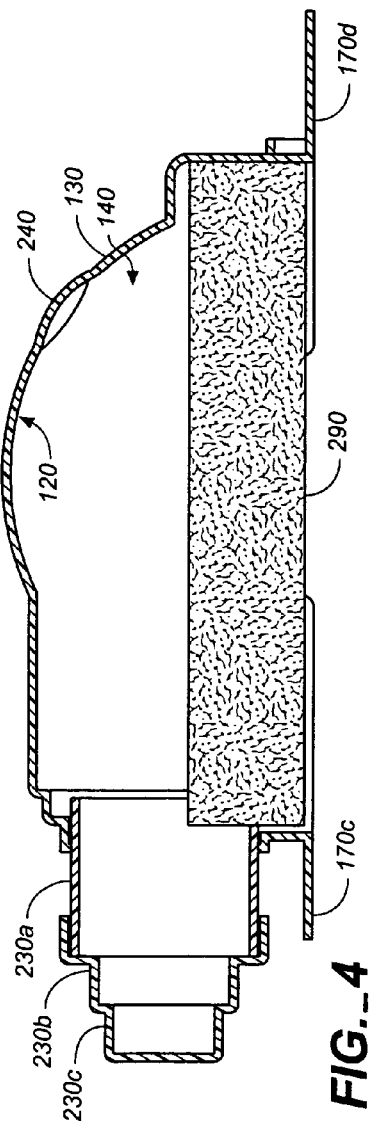
FIG._4

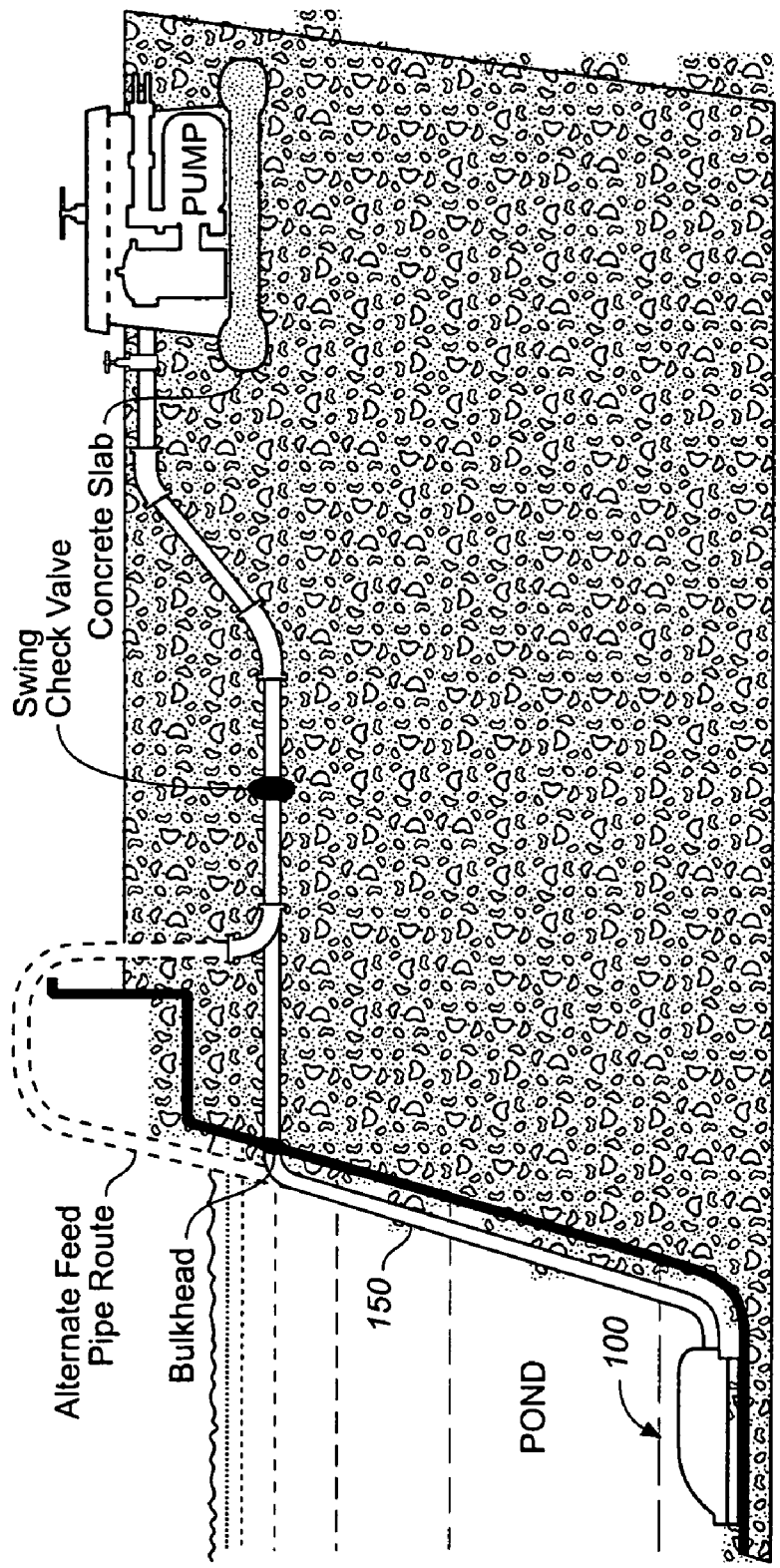
FIG._5

WATER INTAKE OPEN CAVITY DRUM FOR ORNAMENTAL AND FISH PONDS

CROSS REFERENCE TO RELATED APPLICATIONS

The present application claims the benefit of the filing date of U.S. Provisional Patent Application Ser. No. 60/548,499, filed Feb. 25, 2004.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to drains for ponds, and more particularly to a water intake drum for installation in ornamental and fish ponds.

BACKGROUND INFORMATION AND DISCUSSION OF RELATED ART

Many ornamental ponds and fish ponds are constructed with in-ground mechanical plumbing systems to circulate and clean the pond water. Such systems may include, at a minimum, a pump fed filtering system with floor pipe plumbing and a floor or basin drain. However, many ponds are made without expensive built-in plumbing, and for those ponds some kind of retro-fit filtration system may be employed. Such systems are of three general kinds, including mechanical, biological, and chemical. The present invention comprises a mechanical filtration system for after-construction installation in ornamental and fish ponds.

Pond filters are known, as evidenced by the following exemplary patents.

U.S. Pat. No. 6,447,675, which teaches a mechanical system for filtering and treating waste generated or collected in the water of a fish pond. The system includes a pump, pre-filter, piping, a valve assembly, and a filter media container enclosing discrete filter media, which are hollow, plastic structures with a external ribs and internal dividing walls. The filter media has a high surface area-to-volume ratio and can support a high volumetric density of naturally occurring heterotrophic bacteria. The heterotrophic bacteria establish colonies on the internal and external surfaces of the filter media and biologically metabolize waste that is trapped on the media. The bacterial metabolization transforms much of the waste to an aesthetically and biologically neutral form thereby reducing the need for chemical treatment of the pond water. The system includes a backwashing mode to agitate and remove unreacted waste from the system and direct the waste stream out of the system, preferably to be used as fertilizer.

U.S. Pat. No. 5,160,039, to Colburn, teaches an aerobic bacteria filtration apparatus for aquatic ponds. It includes a cylindrical tube that houses a plasticized media derived from horse hair or hog hair. The media is suitable for supporting the growth of colonies of aerobic bacteria. Water is drawn into an intake port at one end of the tube and then across the plasticized media by submersible pump coupled to the other end of the tube. The aerobic bacteria digests and degrades waste products suspended in the water as it is drawn across the plasticized media, and the cleansed water is discharged into the aquatic pond.

The foregoing patents and prior art device reflects the current state of the art of which the present inventor is aware. Reference to, and discussion of, this patent is intended to aid in discharging Applicant's acknowledged duty of candor in disclosing information that may be relevant to the examination of claims to the present invention. However, it is respectfully submitted that the above-indicated patent does not disclose, teach, suggest, show, or otherwise render obvious, either singly or when considered in combination with other prior art devices, the invention described herein.

BRIEF SUMMARY OF THE INVENTION

The present invention is a water intake open cavity drum for use in a mechanical filtering system for ornamental and fish ponds. The invention bears the proprietary name of the "Aqua Art Retro Drain," and as used herein this name is synonymous and interchangeable with "water intake open cavity drum," and "the retro-drain," and "the present invention," and "the inventive apparatus."

The retro-drain is adapted for use in 500-1,400 gallon ponds lacking a built-in floor or basin drain. It functions like an initial water intake system and may be used in conjunction with centrifugal pumps, in-line pumps, and gravity fed filter systems. It is not intended for use with submersible sump pumps. The retro-drain is designed for removing organic waste accumulations on the pond floor without imperiling the pond's aquatic inhabitants.

The retro-drain includes three principal components: a drum body; a short length of ABS plastic pipe; and a multi-size pipe plumbing adapter. Intake suction pipe size is selected based on the size of the pond, the filter type, and the maximum suction for the length of pipe required and the particular diameter of pipe employed. The pipe adapter is cut to a PVC handsaw or hacksaw so as to leave several inches of pipe port slip area to which the intake suction pipe will be connected.

Extending outwardly from the drum body are stabilizing feet adapted for placement flat on the pond floor. However, because there may be instances where the pond floor will not allow for flat placement of the stabilizing feet, the feet are fabricated of malleable material that may be shaped and tailored to fit the pond floor. Such shaping requires only that the stabilizing feet be slightly heated with a hair dryer, stove top burner, heat gun, or the like.

As noted, the present invention is intended for use in fish ponds. However, the device provides high powered suction of water and therefore fish must be protected from becoming sucked into the intake suction pipe and the filtering system pump. Accordingly, in ponds bearing aquatic life, the open cavity drum is preferably equipped with mesh material (a pre-filter media) to prevent small animals from getting sucked into the system. Optimal mesh material is a rigid mat media material, such as that made by MATALA®, which is a biological filter media having various densities and thicknesses according to the designated use. The MATALA® biofilter products come in four densities that are all rigid, highly aerobic, have a high surface area, are slightly buoyant with significant interstitial space, are easy to clean, and are durable. (MATALA® is a trademark of BHB Asia Technology Co., Ltd., Tzu Li 2St., Wu Chi Town Taichung, Taiwan.) The choice of this media is due to its ability to effectively separate large particles from small particles while maintaining an aerobic free flow of water without channeling.

It is therefore an object of the present invention to provide a new and improved water intake open cavity drum for outdoor ornamental and aquatic life ponds.

It is another object of the present invention to provide a new and improved water intake drum that includes a cavity housing filtering media across which water is drawn by a pumping system.

A further object or feature of the present invention is a new and improved water intake drum for a pump-driven water filtering system that is configured to enhance water intake and output.

An even further object of the present invention is to provide a novel water intake open cavity drum that has a low profile and blends nicely into the aquatic environment.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawing wherein:

FIG. 3 is a side view in elevation thereof;

FIG. 4 is a cross-sectional side view in elevation taken generally along section lines 4-4 of FIG. 2; and FIG. 5 is a schematic side view showing a possible pump fed filter system employing the water intake open cavity drum of the present invention.

Figure 1:
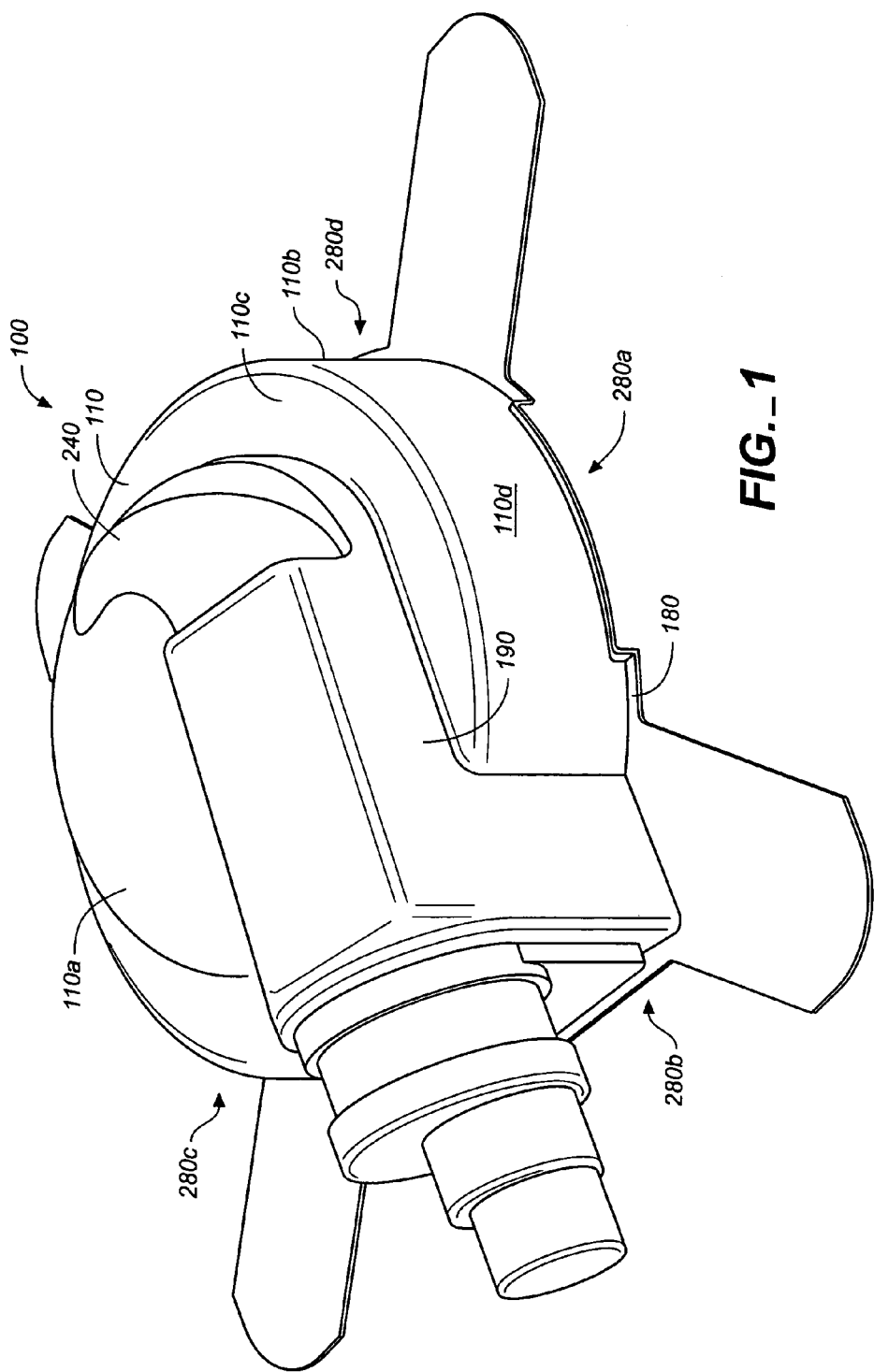
FIG. 1 is perspective view of the water intake open cavity drum for ornamental and fish ponds of the present invention.

The invention will be better understood and objects other than those set forth above will become apparent when consideration is given to the following detailed description thereof. Such description makes reference to the annexed drawings wherein:

DRAWING REFERENCE NUMERALS 100 invention generally
110 drum body
110a upper dome-shaped portion
110b lower cylindrical portion
110c shelf
110d circumferential side of lower cylindrical portion
120 upper interior surface of upper dome-shaped portion
130 dome shell
140 dome-shaped cavity
150 intake suction pipe
160 footprint of drum body
170a-d stabilizing feet
180 lower portion of drum body
190 upper portion of drum body
200 water outlet
210 longitudinal axis of water outlet
220 radius of drum body
230 multi-size pipe plumbing adapter
230a first pipe connection size (of pipe plumbing adapter)
230b second pipe connection size (of pipe plumbing adapter)
230c third pipe connection size (of pipe plumbing adapter)
240 recessed tapering arcuate channel (in upper portion of dome channel)
250 inboard side of pipe plumbing adapter
260 interior side of drum body
270 venturi
280a-d water inlet openings (in base of dome shell)
290 filtering media

DETAILED DESCRIPTION OF THE PREFERRED EMBODIMENTS OF THE INVENTION

Figure 2:
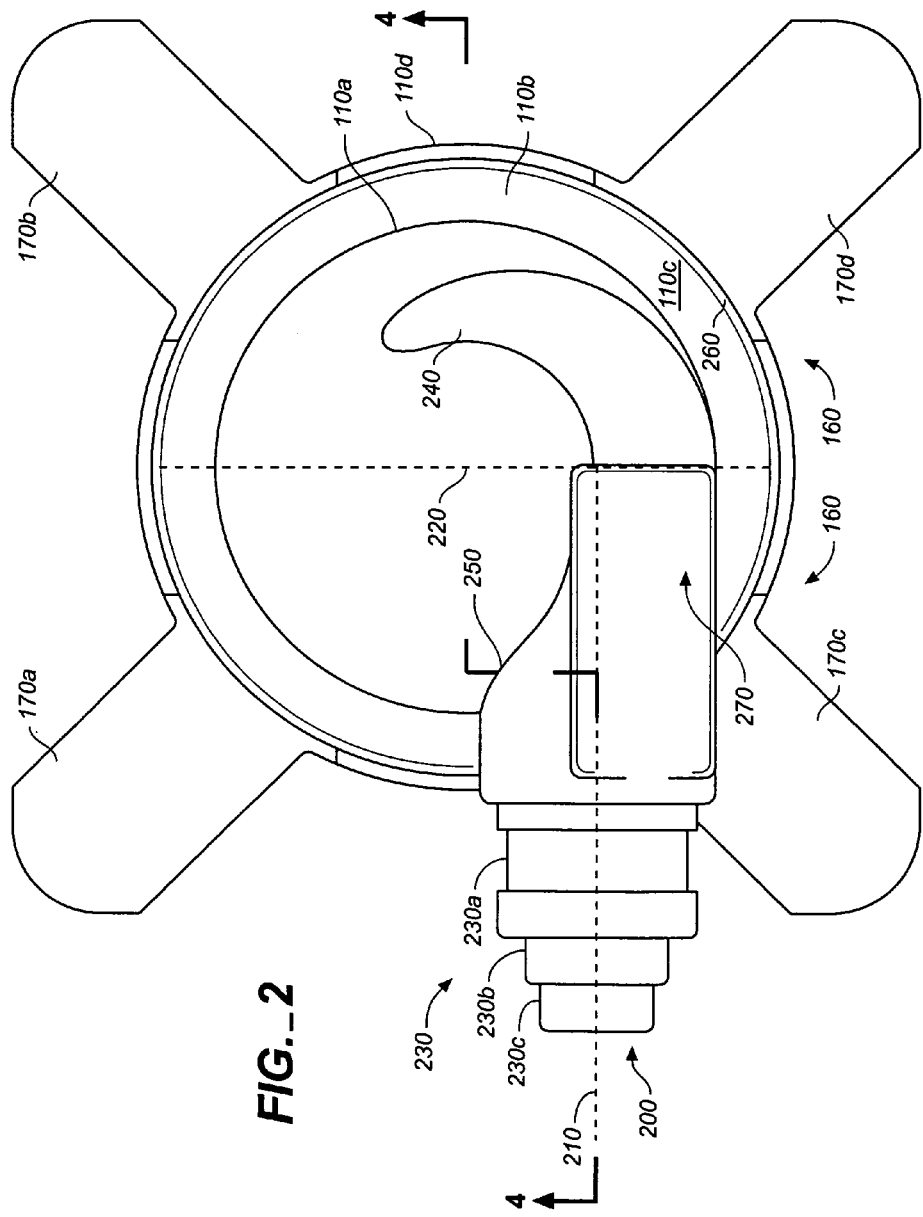
FIG. 2 is a top plan view thereof.

Referring to FIGS. 1 through 5, wherein like reference numerals refer to like components in the various views, there is illustrated therein a new and improved water intake open cavity drum for ornamental and fish ponds, generally denominated 100 herein. FIGS. 1-5 illustrate a first preferred embodiment of the present invention, which comprises a drum body 110, including an upper dome-shaped portion 110a and a lower cylindrical portion 110b, the latter having a larger inner diameter than the former. The upper dome-shaped portion is divided from the lower cylindrical portion, both interiorly and exteriorly, by a shelf 110c that extends outwardly from the lowest reach of the upper dome-shaped portion, and inwardly and at a substantially right angle to the circumferential side 110d of the lower cylindrical portion. The upper dome-shaped portion has an upper interior surface 120 which is curved, arched, and substantially dome-shaped. Thus, the upper dome-shaped portion is a dome shelf 130 that defines a partial dome-shaped cavity or interior 140 that cooperates with the suction forces originating from the intake suction pipe 150 to create a vortex effect in the water within the cavity during operation. Additionally, the instantaneous decrease in diameter from the larger inner diameter of the lower cylindrical portion 110b to the smaller diameter of the upper dome-shaped portion 110a induces a rapid angular acceleration of water as it is sucked by the pump upwardly into and around the sides of the intake drum.

Viewed from above (see FIG. 2), the drum body 110 describes a generally circular footprint 160, and includes a plurality of stabilizing feet, preferably four, 170a-d, radiating outwardly from the lower cylindrical portion 180 of the dome shell. This configuration and design gives the retro-drain the crude but notable appearance of a turtle, which fits nicely into an outdoor aquatic environment. Disposed along the upper dome-shaped portion 190 of the drum body is a water outlet 200 having a longitudinal axis 210 and, if extended, would define a cord to the arcuate base of the drum body. The longitudinal axis 210 of the water outlet is perpendicular to the radius 220 of the drum body.

As will be readily appreciated by those familiar with similar systems, the water outlet 200 of the drum body is connected to a hose to the system pump. Accordingly, a pipe plumbing adapter 230 integral with the water outlet extends radially from the upper dome-shaped portion of the drum body. The pipe plumbing adapter has a plurality of step-down diameters disposed along its length, preferably including at least three pipe connection sizes 230a, 230b, 230c, any of which can be cut near its distal end so as to leave a length sufficient to accommodate a complementary-sized intake suction pipe 150 connected to the system pump. The suction pipe is fitted tightly into or onto the end of the adapter opening and affixed with a glue joint, a welded, a clamp, or some combination of these or other means widely known in the art. The preferred method of affixing the pipe is accomplished using ABS glue.

The upper portion of the dome shell further includes a recessed tapering arcuate channel 240 which also induces vortex fluid action as water is sucked from the cavity into an intake suction pipe 150 coupled to the pipe plumbing adapter and water outlet. Further, proximate the point th pipe plumbing adapter 230 merges into the dome, the water outlet volume expands dramatically. At that point, an inboard side 250, which tapers toward the interior side 260 of the upper dome-shape portion of the drum body, opens outwardly to the water outlet opening. Thus, the fluid pressure differentials create a venturi 270 in the recessed tapering arcuate channel.

During operation water is pulled through arcuate water inlet openings 280a-d at the base of the lower cylindrical portion of the dome, accelerated into the upper dome-shaped portion, and then directed into the recessed tapering arcuate channel 240, where it is further accelerated through the venturi and out the water outlet through the multi-sized pipe plumbing adapter 230.

In order to protect aquatic life from harm caused by intake into the water intake drum (or, worse, the filtering system itself), and to prevent large particulate matter from entering the pump, a filter media is inserted into the cavity of the water intake drum. The filtering material is preferably a rigid mat media 290, such as that made by MATALA®, and sized for secure placement in the cavity. Either a uniform density or mesh size may be employed, or various densities may be stacked to address specific filtration requirements. The material may be cut precisely to size, welded into the open cavity, and shaped with a razor knife. Thus, as water is rapidly pulled into a swirling vortex, it circulates through the filtering media multiple times before it passes out from the interior cavity through the water outlet.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed is:

1. A water intake open cavity drum, comprising:
   a drum body having an upper dome-shaped portion and a lower cylindrical portion which collectively define a cavity;
   a shelf dividing said upper dome-shaped portion and said lower cylindrical portion;
   a plurality of stabilizing feet radiating outwardly from said lower cylindrical portion;
   at least one water inlet disposed in said lower cylindrical portion; and
   a water outlet disposed from said upper dome-shaped portion and adapted for connection to a pump hose;
   a pipe plumbing adapter integral with said water outlet and extending radially from said upper dome-shaped portion, said pipe plumbing adapter having a plurality of step-down diameters disposed along its length; and
   a recessed tapering channel in said upper dome-shaped portion such that when suction is applied through said pipe plumbing adapter, a vortex fluid action is induced in water sucked from said cavity into and through said water outlet.

2. The water intake open cavity drum of claim 1, further including a venturi disposed before said water outlet.

3. The water intake open cavity drum of claim 1, further including a biological filter media filling said cavity.

4. The water intake open cavity drum of claim 1, wherein said shelf extends outwardly from the lowest reach of the upper dome-shaped portion, and inwardly and at a substantially right angle to the side of the lower cylindrical portion.

5. The water intake open cavity drum of claim 1, wherein said upper dome-shaped portion includes an arched upper interior surface such that when water is pulled through said water outlet by a pump, suction forces originating from the intake suction pipe create a vortex effect in the water within the cavity during operation.

6. The water intake open cavity drum of claim 1, wherein said body has a radius and said water outlet has a longitudinal axis perpendicular to said radius.

7. The water intake open cavity drum of claim 1, wherein said pipe plumbing adapter includes at least three pipe connection sizes, each of said pipe connection sizes having a length such that it can be cut near its distal end to leave a length sufficient to accommodate a complementary-sized intake suction pipe connected to a filter system pump.

8. The water intake open cavity drum of claim 1, wherein said at least one water inlet comprises a plurality of arcuate openings in the lower cylindrical portion of said drum body.

9. A water intake drum, comprising:
   a lower portion defining a lower interior cavity;
   a dome-shaped upper portion defining an upper interior cavity having less volume than the lower interior cavity, wherein said upper portion includes an interior side having an arcuate recess proximate said water outlet;
   at least one water inlet disposed in said lower portion; and
   a water outlet disposed in said upper portion.

10. The water intake drum of claim 9, further including a plurality of stabilizing feet.

11. The water intake drum of claim 9, wherein said upper portion and said lower portion are divided by a shelf.

12. The water intake drum of claim 9, wherein said lower portion is generally cylindrical.

13. The water intake drum of claim 9, further including filter media interposed between said at least one water intake and said water outlet.

14. The water intake drum of claim 9, further including a multi-sized pipe plumbing adapter integral with said water outlet.

15. The water intake drum of claim 9, further including a venturi interposed between said water intake and said water outlet.

* * * * *